United States Patent Office 2,726,484
Patented Dec. 13, 1955

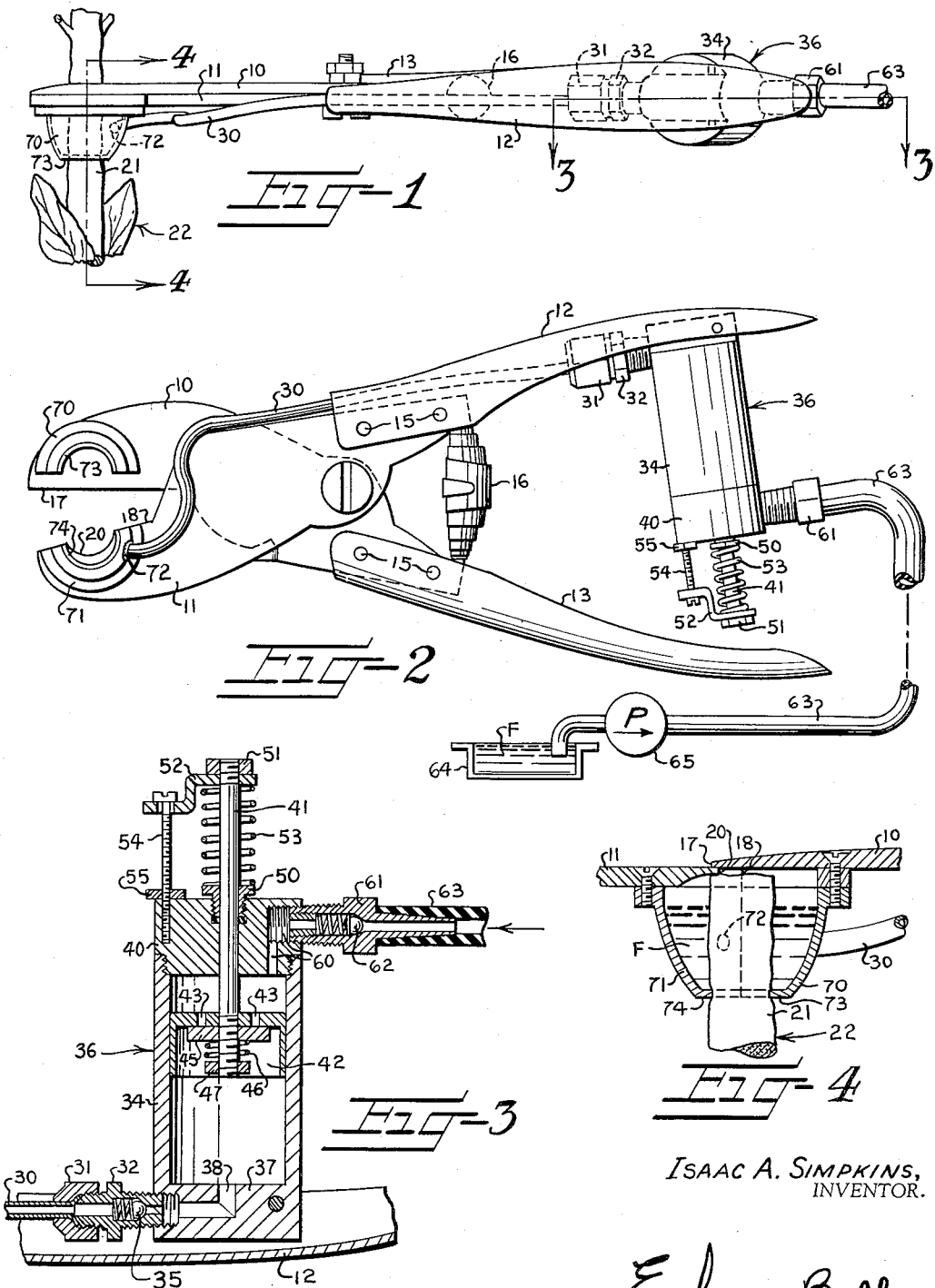

2,726,484
IMPLEMENT FOR APPLYING LIQUID TO PLANTS

Isaac A. Simpkins, Thomasville, N. C.

Application May 22, 1952, Serial No. 289,312

7 Claims. (Cl. 47—1)

This invention relates to an improved implement for applying liquid to plants or the like which have been cut and, more especially, to confining means associated with said implement for confining the liquid around the area adjacent the cut portion of the plant for disinfecting the same.

Heretofore, various types of implements have been used for applying liquid such as herbicide or disinfectant to cut plants, and in using such implements, it has been desirable to provide means for emitting a predetermined amount of liquid such as herbicide, disinfectant or the like to the stem or branch being cut. Such implements, as have heretofore been used, have not been practical in that the means for emitting the fluid have caused the same to be sprayed indiscriminately about the plant being cut and no means were provided for confining the fluid at the desired area. Further, pumping means provided for the fluid in implements of the type such as are disclosed in the prior art, have been impractical and have failed to give positive action.

It is, therefore, a primary object of this invention to provide in an implement of the type described, which implement may be used for shearing of plants or the like, confining means associated with the implement and adapted to receive a predetermined amount of liquid to confine the same about a designated portion of the plant being cut. This invention is primarily adapted to be used in the trimming and clipping of tobacco plants.

As is well known to the art, when tobacco is grown, and before it reaches maturity, it is necessary to clip the upper portion of the tobacco stalk to prevent the same from going to seed and to cause the leaves on the lower part of the stalk to grow larger. If the stalk is clipped without the application of some form of disinfectant, the upper portion of the plant will frequently rot and dry out and, more often, bugs or other insects will be attracted to the plant and will eat the inner portion of the stalk, causing the plant to wither or die, or, at least, become stunted.

Now, in using conventional implements for this type of operation, it has been necessary to apply the disinfectant by hand or by use of one of the devices which would spray the disinfectant indiscriminately around the upper portion of the tobacco plant and would not, necessarily, cause disinfectant to be directed around the entire periphery of the upper portion of the tobacco stalk. Also, it is frequently desirable that the disinfectant being used be prevented from contacting the cut portion of the plant as it is applied to the peripheral surface of the plant adjacent the cut area.

To this end, there is provided an implement comprising shears having pivotally-connected blades with each of said blades having one-half of an open-bottomed cup-like fluid restricting or confining means secured thereto, and said implement being provided with means for admitting a predetermined amount of fluid into said cup-like fluid restricting or confining means, whereby, upon the plant being sheared, the proximal bottom edges of the confining means on each blade will grasp the plant, or occupy positions closely adjacent the plant, and the fluid introduced thereto will flow or swirl around the confining means to saturate the outer surface or bark of the plant around the entire periphery thereof, but will not flow onto the raw upper end of the stalk being cut.

It is another object of this invention to provide an implement of the type described having an improved pump structure for causing positive emission of the disinfectant fluid upon the shears being closed.

It is another object of the invention to provide means for topping tobacco plants and spraying a liquid onto the tobacco stalk which will inhibit the growth of suckers or sprouts at the junction points of the stems of the tobacco leaves with the stalk portion of the plant.

While the instant invention is readily adaptable for use with other types of plants, its primary utility resides in the efficient care and treatment of tobacco plants in that it provides in combination means for cutting the top of the stalk and means for preventing the formation of suckers in a single operation. Both steps are of great importance and combine to produce a healthy plant with a resulting high grade of tobacco. The removal of the suckers is accomplished by treating them with fluid which is applied in such a manner as to eliminate any possibility of spotting and thereby damaging the tobacco leaves.

Some of the objects of the invention having been stated, other objects will appear as the description proceeds, when taken in connection with the accompanying drawings, in which—

Figure 1 is a side elevation of the improved implement showing the same in association with the upper portion of a plant prior to cutting said plant;

Figure 2 is a bottom plan view of the implement looking at the bottom of Figure 1 and showing the source of disinfectant somewhat schematically;

Figure 3 is a sectional plan view, taken along the line 3—3 in Figure 1, showing the structure of the pump for emitting the disinfectant;

Figure 4 is a vertical sectional view taken along the line 4—4 in Figure 1 but showing the cutting blades in a different position, which they occupy upon cutting the plant, and further illustrating the structure of the half-cup-like members on the cutting blades.

The improved severing and disinfectant applying implement comprises a pair of pivotally-connected shearing elements or blades 10 and 11 having respective handle portions 12 and 13 secured thereto, as by rivets 15. The handle portons 12 and 13 are preferably U-shaped in cross section and are held in normally open position by a spring 16. The blades 10 and 11 are provided with sharpened edges 17 and 18 and the edge 18 may be cut away, as at 20, if desired, and the curved edge of the cut away portion is also preferably sharp. The spring 16 normally holds the shears in open position to permit the blade edges 17 and 18 to straddle a plant to be cut, such as the stalks 21 of a tobacco plant having leaves 22 shown somewhat schematically in Figures 1 and 4.

Now, a means is provided for emitting a liquid disinfectant or the like to the peripheral area of the stalk 21, which means comprises a conduit or pipe 30 of rigid material, one end of which is connected to the disinfectant confining means to be later described. The conduit 30 is formed in an S shape and extends through the space between handle 12 and blade 11 at the juncture thereof, as shown in Figure 2. A portion of the conduit 30 is thus disposed within the confines of the U-shaped handle 12. The end of the conduit 30 in the handle 12 is provided with a nut 31 for threadably connecting the same to a tubular valve fitting 32 having a threaded portion threadably embedded in one side of a cylinder 34 of a pump broadly designated at 36. The valve fitting 32 is provided with ball check valve 35.

One end of the cylinder 34 is closed, as at 37, and the closure portion 37 has a passageway 38 therein which connects the fitting 32 with the interior of the cylinder 34. The other end of the cylinder 34 is closed as by a plug or cylinder head 40 threadably mounted therein. A piston rod 41 slidably penetrates the plug 40, in extending into the interior of the cylinder 34, and has a cup-shaped piston 42 threadably secured thereon.

The piston 42 is provided with a plurality of small apertures 43 and a resilient washer 45 is slidably mounted on the piston rod adjacent the piston 42 and sometimes closes the apertures 43. The washer 45 is resiliently held against the piston by means of a spring 46 and a nut 47. A suitable packing gland 50 is provided where the piston rod penetrates the plug 40 and the piston rod 41 has a stop member in the form of a nut 51 threadably mounted on the outer end thereof. A bracket 52 and a tension spring 53 are confined between the gland 50 and the nut 51. Thus, the spring 53 normally urges the piston rod 41 outwardly.

The bracket 52 is also slidably mounted on a screw 54 threadably embedded in the plug 40 and which has a lock nut 55 threadably mounted thereon. Adjustment of the nut 55 and screw 54 will move the bracket 52 relative to the plug 40 to vary the effective stroke of the piston 42. The plug 40 has a port or passageway 60 therein and a suitable inlet valve fitting 61 is threadably mounted in the inlet port or passageway 60, which communicates with the interior of the cylinder 34. The fitting 61 has a ball check valve 62 therein and has a tube 63, which is preferably flexible, connected thereto.

The tube 63 extends to a suitable source of liquid disinfectant or herbicide embodied in a reservoir 64 having a supply of disinfectant F therein and, if desired, an auxiliary pump 65 may be placed between the source 64 and the fitting 61 to provide additional pressure for the fluid flowing through the pipe line or tube 63. The outer end of the piston rod 40 is so disposed as to be engaged by the inner surface of the U-shaped handle 13 upon the handles 12 and 13 being moved toward each other. In this instance, any disinfectant which is in the interior of the cylinder 34 between the piston 42 and the cylinder closure portion 37 will be forced outwardly through the passageway 38 as the piston is moved from top to bottom in Figure 3. The pressure of the fluid on the check valve 35 will open same, permitting the disinfectant within said above-defined area to be emitted in a short positive spurt through the tube 30 to the blades 10 and 11 for application to the plant in a manner to be described.

When the piston 42 is moved in a pumping stroke, as described, the washer 45 will be forced against the base of the piston 42 to close the apertures 43 so that all of the fluid disposed between the piston 42 and the cylinder closure portion 37 will be forced through the passageway 38.

Now, upon the handles 12 and 13 being released, the spring 16 will cause the same to move apart and, as the handle 13 moves out of engagement with the piston rod 41, the compression spring 53 will move the piston back to the position substantially as shown in Figure 3 so that the piston is adjacent the plug 40.

Upon this backward or intake stroke, suction will cause the washer 45 to move away from the base of the piston to permit fluid to flow from the area adjacent the plug 40 through the apertures 43 into the area between the piston 42 and the cylinder closure portion 37. This suction will also cause the check valve 62 to open and permit fluid, flowing through the tube 63, to flow through the fitting 61 into the area between piston 43 and plug 40, and consequently, through the apertures or bores 43. Thus, upon each release stroke, the cylinder 34 will again be filled with liquid disinfectant ready for a positive emission upon the next pressure stroke.

By adjusting the nut 55 and the screw 54, the effective stroke of the piston 42, upon each closure of the handles 12 and 13, can be regulated, thus permitting regulation of the amount of fluid to be emitted through the conduit 30. In the means heretofore provided there have been no effective provisions for regulating the amount of fluid discharged at the blades nor have any means been provided which would give a positive strong emission of fluid such as the improved pump disclosed in the application.

Heretofore in devices of this kind, not only has the spray been weak and ineffective in its volume, but the spray has been directed generally toward the cutting surfaces of the blades which would cause the same to strike only one side of the plant being cut and to spray around the plant. Now, in the application of disinfectant or the like to tobacco plants which are topped, it is desirable to apply the disinfectant around the entire periphery of the plant portion being cut without applying disinfectant into the cut area itself. In the disinfectant applying means of the type such as have heretofore been used, the spray would strike the cut area and would not surround the entire periphery of the stem.

In clipping tobacco plants, one of the primary purposes of applying disinfectant or herbicide there is to prevent bugs and other insects from climbing up the stalks and burrowing into the cut portion thereof and it is, therefore, necessary that the disinfectant be applied around the entire periphery of the stalk. In order to insure this, there is provided a fluid confining means in the form of a semi-cup-like member or half-cup-like member secured to each of the blades 10 and 11. The semi-cup-like members are indicated at 70 and 71 and depend from the respective blades 10 and 11. The end of the pipe 30 remote from the pump 36 is connected to and penetrates the member 71, as at 72. The semi-cup-like members 70 and 71 are each provided with lower flanges 73 and 74, respectively, which are cut away in a semi-circle so that, when the blades 10 and 11 are closed, the members 70 and 71 will meet to form a cup having a circular opening in the base thereof.

The flanges 73 and 74 of the confining means are so shaped as to engage or closely surround the outer periphery or bark portion of the stalk 21 to be cut. As the fluid, indicated at F in Figures 2 and 4, is introduced to within the confines of these semi-cup-like members 70 and 71, it will swirl around the interior walls of the members 70 and 71 and be substantially confined against running down the stalk 21 by the flanges 73 and 74. This results in thorough saturation of the upper portion of the stalk 21 around the entire periphery thereof.

The disinfectant will, thus, flow around the periphery of the stalk while the cutting blades 10 and 11 are held in closed position to substantially cover and protect the cut portion of the stalk so that very little, if any, of the disinfectant will enter into the cut area. By means of the confining means, comprising members 70 and 71, the disinfectant directed thereto from the pipe 30 is evenly distributed and serves the desired purpose which could not be effected by the implements heretofore known and which were not provided with such confining means. After the cutting tool is removed, the fluid deposited around the stalk will run down the stalk and become lodged in the depressions where the stems are joined to the stalk to thereby inhibit the growth of suckers. By use of the confining members only a predetermined amount of fluid is permitted to run down the stalk and none is sprayed onto the plant leaves.

In the drawings and specification there has been set forth a preferred embodiment of the invention and, although specific terms are employed, they are used in a generic and descriptive sense only and not for purposes of limitation, the scope of the invention being defined in the claims.

I claim:
1. In a clipping element having a pair of pivotally-connected members with mating blades thereon, the combination of a pump secured to one of said pivotally-connected members and adapted to be connected to a source of fluid, mating half-cup-like confining members secured to said blades, and a conduit leading from said pump to at least one of said confining members, and communicating with the interior thereof whereby said confining members will serve to confine fluid emitted from said pump through said conduit and to the confining members and will thereby limit initial dispersion of the fluid to a predetermined area of the member being severed by said blades.

2. In a clipping implement having a pair of pivotally-connected members with mating blades thereon, the combination of a pair of mating substantially semi-circular cup-like confining members secured to said blades, there being one of the confining members secured to each blade, the bottoms of the confining members being provided with mating substantially semi-circular openings therein, a pump carried by at least one of said pivotally-connected members and to which a source of fluid is connected, a pipe connecting said pump to at least one of said confining members and communicating with the interior thereof, and means responsive to movement of said blades into cutting engagement with each other for directing a predetermined amount of fluid under pressure from said pump to the corresponding confining member.

3. In a clipping implement having a pair of pivotally-connected members with mating blades thereon, the combination of a pair of mating substantially semi-circular cup-like confining members secured to said blades, there being one of the confining members secured to each blade, the bottoms of the confining members being provided with mating substantially semi-circular openings therein, a pump carried by at least one of said pivotally-connected members and to which a source of fluid is connected, a pipe connecting said pump to at least one of said confining members and communicating with the interior thereof, means responsive to movement of said blades into cutting engagement with each other for directing a predetermined amount of fluid under pressure from said pump to the corresponding confining member, and means operable automatically upon said blades being moved apart from each other to replenish the supply of fluid in the pump preparatory to a repeat operation.

4. In a cutting implement in the form of shears including a pair of pivotally-connected members provided with mating blades thereon for cutting stalks of plants, the combination of a substantially semi-circular tubular member secured to each of said blades, said semi-circular tubular members being so positioned as to engage each other and tightly grip the stalk to form a tubular confining member when the blades are moved to closed position in a cutting operation, an inwardly facing substantially semi-circular flange on the end of each of the semi-circular tubular members remote from the corresponding blade, and means operable automatically upon said blades being moved into engagement and upon said semi-circular tubular members being moved into engagement for directing fluid under pressure to the tubular member thus formed whereby, upon said semi-circular tubular members being positioned astraddle a stalk being cut by the blades, the flanges thereon will confine the fluid to the area of the stalk embraced by the semi-circular tubular members and the cutting blades until the cutting implement is removed from the stalk at which time the fluid will be free to flow evenly about the periphery of the stalk.

5. In a cutting implement in the form of shears including a pair of pivotally-connected members provided with mating blades thereon, the combination of a substantially semi-circular tubular member secured to each of said blades, said semi-circular tubular members being so positioned as to engage each other and form a tubular confining member when the blades are moved to closed position in a cutting operation, an inwardly facing substantially semi-circular flange on the end of each of the semi-circular tubular members remote from the corresponding blade, and means operable automatically upon said blades being moved into engagement and upon said semi-circular tubular members being moved into engagement for directing a predetermined amount of fluid under pressure to the tubular member thus formed whereby, upon said semi-circular tubular members being positioned astride a stalk being cut by the blades, the flanges thereon will confine the fluid to the area of the stalk embraced by the semi-circular tubular members and the cutting blades until said flanges are disengaged from said stalk.

6. In a clipping element for clipping stalks of plants and the like, said clipping element having a pair of pivotally-connected members with mating blades on corresponding ends thereof, the combination of a half cup-like member secured to each of said blades, said half cup-like members being adapted to engage each other to form a cup-like member when the blades are in closed position, said half cup-like members each having a substantially semi-circular opening in the bottom thereof defining a semi-circular flange adapted to tightly grip the stalk of the plant at a point spaced beneath the point of severance upon the stalk being severed by the blades, and means operable automatically upon said half cup-like members being moved into mating engagement for admitting a predetermined amount of fluid to the cup-like member formed from the mating half cup-like members whereby the fluid is initially confined within the cup-like member and about the portion of the stalk encompassed by said cup-like member to thereby prevent the fluid from contacting leaves on the plant and whereby said fluid is free to flow directly down the stalk without contacting the leaves upon said clipping element being removed from the stalk.

7. A clipping tool comprising a pair of handle members, a pair of shearing elements, a cup-like confining member secured to each of said shearing elements, a pump carried by said tool, a conduit leading from said pump to at least one of said confining members and communicating with the interior thereof whereby said confining members will serve to confine fluid emitted from said pump through said conduit and to the confining members and will thereby limit dispersion of the fluid to a predetermined area of the member being severed by said shearing elements.

References Cited in the file of this patent
UNITED STATES PATENTS

| | | |
|---|---|---|
| 773,743 | Von Hoffmann | Nov. 1, 1904 |
| 1,056,046 | Myers | Mar. 18, 1913 |
| 2,462,701 | Wirth | Feb. 22, 1949 |
| 2,600,540 | Johnson | June 17, 1952 |

OTHER REFERENCES

"The Clip-Oil," published Oct. 1950 as Information Series No. 3 by Dept. of Agr. Engineering, N. C. Agr. Expt. Sta., Raleigh, N. C.; 17 pp.